United States Patent

Koch

[15] 3,665,677

[45] May 30, 1972

[54] METHOD AND DEVICE FOR ABSORBING GASES OR COMPONENTS OF GAS MIXTURES

[72] Inventor: Christian Koch, Erlangen, Germany

[73] Assignee: Siemens Akteingesellschaft, Berlin and Munich, Germany

[22] Filed: Nov. 12, 1969

[21] Appl. No.: 875,954

[30] Foreign Application Priority Data

Nov. 13, 1968 Germany ..................... P 18 08 623.2
Mar. 29, 1969 Germany ..................... P 19 16 312.7

[52] U.S. Cl. ............................................ 55/56, 55/68, 55/90, 55/233, 261/113
[51] Int. Cl. ..................................................... B01d 19/00
[58] Field of Search ..................... 55/56, 68, 90, 91, 93, 94, 55/97, 98, 226, 233; 261/106, 113, 114

[56] References Cited

UNITED STATES PATENTS

| 2,619,336 | 11/1952 | Schilling | 261/113 |
| 3,321,890 | 5/1967 | Barnharf | 55/32 |
| 3,386,228 | 4/1968 | Hartmann | 55/68 |

Primary Examiner—Charles N. Hart
Attorney—Curt M. Avery, Arthur E. Wilfond, Herbert L. Lerner and Daniel J. Tick

[57] ABSTRACT

Method of absorbing gases or components of gas mixtures includes introducing from below the gas and a liquid solvent for absorbing the gas into at least one absorbing column having a plurality of vertically spaced filter plates formed of highly porous sintered material and provided with flow-through openings whereby absorption of the gas by the liquid solvent occurs partly within the pores of the filter plates, and passing the liquid solvent with the gas dissolved therein through at least one desorbing column having vertically spaced filter plates similar to those in the absorbing column for desorbing the gas from the liquid solvent.

22 Claims, 8 Drawing Figures

Patented May 30, 1972 3,665,677

METHOD AND DEVICE FOR ABSORBING GASES OR COMPONENTS OF GAS MIXTURES

My invention relates to method of absorbing gases or components of gas mixtures by means of liquids, as well as to device for carrying out the method.

Gas absorption in liquids is generally effected by passing a raw gas, consisting either of the gas to be absorbed or of a mixture of gases including the gas to be absorbed, into a vessel containing a liquid solvent of the gas to be absorbed and provided with devices for comminuting and mixing both phases of the gas to be absorbed, i.e. the gaseous phase thereof and the liquid solution phase thereof. Depending upon the proportion of the gas component to be removed from the raw gas mixture, for example, as well as on the solubility thereof in the liquid solvent, the absorption of the gas component will be effected either continuously or discontinuously. In the continuous method, the raw gas always comes into contact with freshly supplied solvent whereas with the discontinuous or interrupted method, the same batch of solvent is mixed with the raw gas until it is saturated with the gas that is to be absorbed, i.e. until the batch of solvent can no longer absorb any more of the particular gas component.

It has been proposed heretofore to employ filling member columns or filter plate columns for absorbing gases by means of liquids.

From the publication Ind. Engng. Chem 41 (1949), pages 1540–1543, it is also known that columns with screen filter plates or trays are more efficient than bubble trays due to the high level of the liquid for absorbing $CO_2$ from natural gas by means of 40 percent potash lye solutions.

It has been found that the heretofore known methods and devices are not suited for absorbing gases from small quantities of raw gas. This is primarily true for fuel cell battery systems which are operated with gases and wherein the gaseous reactants must be purified before being admitted to the electrodes. In many fields of utility, such as electrical traction, for example, it is desired that the purification equipment occupy a very small space. Moreover, purification plants or installations in moving systems, such as electric vehicles, should be as insensitive or independent of the location thereof as possible and should assure an optimal absorption even for changes in location thereof. Furthermore, the solvent should be usable without any limitations as to time, which makes it necessary to install further devices for desorbing the absorbed gas. Also, great difficulties arise from the requirement that the structural volume of the purification equipment be kept as small as possible.

It is accordingly an object of my invention to provide method and device for absorbing gases or components of gas mixtures by means of liquids which avoids the aforementioned difficulties encountered with the heretofore known methods and devices of this general type.

With the foregoing and other objects in view, I provide, in accordance with my invention, method for absorbing gases or components of gas mixtures which comprises introducing the gas or gas mixture and a liquid solvent for absorbing the gas or a component of the gas mixture from below into at least one column furnished with trays or filter plates formed of highly porous sintered material and provided with flow-through openings, whereby the absorption occurs partly within the highly porous plates, and passing the liquid solvent with gas dissolved therein through one or more columns having similar plates whereby the gas is desorbed from the liquid solvent.

According to the device of my invention for carrying out the foregoing method, the trays or filter plates in the columns are formed of predominantly open-pored material such as sintered magnesium aluminum silicate, for example, with the result that part of the liquid employed as gas absorption medium is absorbed by the porous material. The volume of the pores, according to a further feature of my invention, is greater than 50 per cent by volume of the respective plates. Because of the special structure of the highly porous plates, part of the liquid is retained within the plates due to capillary forces, and no reduction occurs in the exchange surfaces even for variations in location.

The diameter of the flow-through openings is determined by the thickness of the porous plates. According to other features of my invention, the ratio of the diameter of the flow-through openings to the thickness of the respective plate is between 0.03 and 0.3, and the ratio of the thickness of the respective plate to the diameter of the plate is greater than 0.1.

In accordance with additional features of the invention, the raw gas and the absorption liquid are passed in the same flow direction through the porous plates of the columns, layers of liquid being formed just above the porous plates, and gas cushions being formed just below the porous plates. The absorption of the gas that is to be removed occurs both within the liquid layers as well as within the porous plates. In the porous plates, the absorption takes place predominantly between the liquid located in the porous material and the gas flowing through the flow-through openings. Because of the hydrostatic pressure of the liquid layers disposed on the porous plates as well as the capillary action in the porous plates, the liquid is furthermore forced out of the highly porous part of the plates into the flow-through openings provided therein so that a liquid flow circuit occurs within each plate and all of the liquid accordingly takes part in the absorption process in this way. The gas flowing upwardly in the column advances or feeds the liquid through the overlying gas cushion into the next higher porous plate, that part of the liquid that was in close contact with the gas, such as the liquid in the flow-through openings for example, being entrained by the flowing gas.

The columns proper are formed of any suitable material which is not attacked or corroded by the absorption liquid or the gases. Plastic materials formed of methyl esters of polymethyl acids as well as copolymers thereof have been found to be suitable in tests that have been carried out to date. Obviously, the columns can also be formed of metal or glass.

Other features which are considered as characteristic for the invention are set forth in the appended claims.

Although the invention is illustrated and described herein as embodied in method and device for absorbing gases or components of gas mixtures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
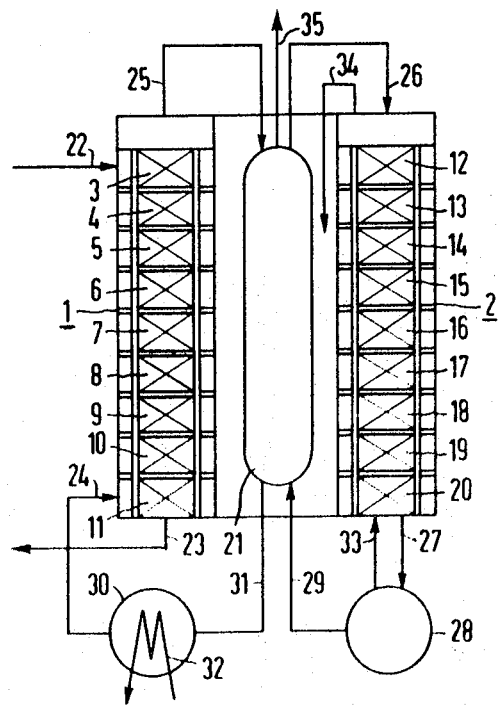
FIG. 1 is a diagrammatic view of a device for absorbing a gas according to my invention, the bottom of the device being located at the left-hand side.

As an example of the method of my invention, a gas mixture consisting of 25 per cent by volume $CO_2$ and 75 per cent by volume $H_2$ was produced by catalytic vapor reformation of methanol. The $CO_2$ was washed out of this gas mixture to about 200 parts per million (ppm) and less in the purification installation schematically shown in FIG. 1. Alkazide lye solution was employed as solvent for the carbon dioxide, and the bound $CO_2$ was again desorbed by heating the liquid solvent to 100° C. The gas throughput was 10 m³ per hour and the liquid solvent throughput was 120 liters per hour.

Referring now more specifically to the drawings and first particularly to FIGS. 1 to 5 thereof, there is shown a device for carrying out the method of absorbing gas or components of gas mixtures according to my invention. The device includes an absorption unit, formed of nine serially connected columns 3 to 11 and a corresponding desorption unit 2, also formed of nine serially connected columns 12 to 20. The columns of both units 1 and 2 are each provided with 13 trays or filter plates of porous material which, in the interest of clarity, are not shown at all in FIG. 1 and only in part in FIGS. 2 and 3. A heat exchanger 21 is located between the absorption unit 1 and the desorption unit 2.

Raw gas discharging from a nonillustrated methanol reformer, for example, passes at 22 from below vertically into the column 3 and traverses the serially connected columns 3 to 11 of the absorption unit 1. The $CO_2$ contained in the raw gas is accordingly absorbed by or dissolved in the alkazide lye solution. The thus purified raw gas discharges from the absorption unit 1 at 23. The fresh or regenerated and cooled alkazide lye solution is supplied from below at 24 (FIG. 2) into the column 11 and passes through the columns 10, 9, 8, 7, 6, 5 and 4 into the column 3, if necessary pumped therethrough by pumps that have not been illustrated in the interest of clarity. Gas and alkazide lye solution travel within each column in the same direction from the sump or base of the column to the head or top thereof. The alkazide lye solution entirely or partly laden with $CO_2$ flows out of the column 3 through a duct 25 and into the heat exchanger 21 and therefrom through the duct 26 successively into the columns 12 to 20 of the desorption unit 2. The $CO_2$-laden alkazide lye solution is preheated in the heat exchanger 21 to about 85° to 90° C. The alkazide lye solution is regenerated by means of steam in the columns 12 to 20 and discharges at 27 into a heater 28 wherein the alkazide lye solution is heated up to about 110° C and vaporization of part of the water contained in the alkazide lye solution occurs. The thus heated alkazide lye solution then flows through the tube connection 29 again into the heat exchanger 21 and there surrenders the heat stored in the alkazide lye solution to the counterflowing unheated $CO_2$-laden alkazide lye solution. The alkazide lye solution flow that has given up some of its stored heat in the heat exchanger 21 then leaves the latter through a line 31 which communicates with a vessel 30 from which the alkazide lye solution is originally supplied. From the vessel 30, the alkazide lye solution is then returned to the column 11, and recirculated through the absorption unit 1 as absorption liquid. The alkazide lye solution supply vessel 30 is cooled by a cooling device 32.

The steam required for desorbing the carbon dioxide is produced in the heater 28 by vaporization of water from the alkazide lye solution. The steam flows through the tube 33 into the column 20 of the desorption unit 2, passes serially through the columns 19, 18, 17, 16, 15, 14 and 13 to the column 12 and discharges from the latter laden with $CO_2$ through the line 34. A line 35 is provided for the $CO_2$ gas that has already been desorbed from the alkazide lye solution in the heat exchanger 21. Of course, instead of the heater 28, a steam generator can be installed which delivers superheated steam for the desorption step.

In FIGS. 2 through 5 there are shown various sections of the absorption unit 1 of FIG. 1 in enlarged view.

Figures 2, 3:
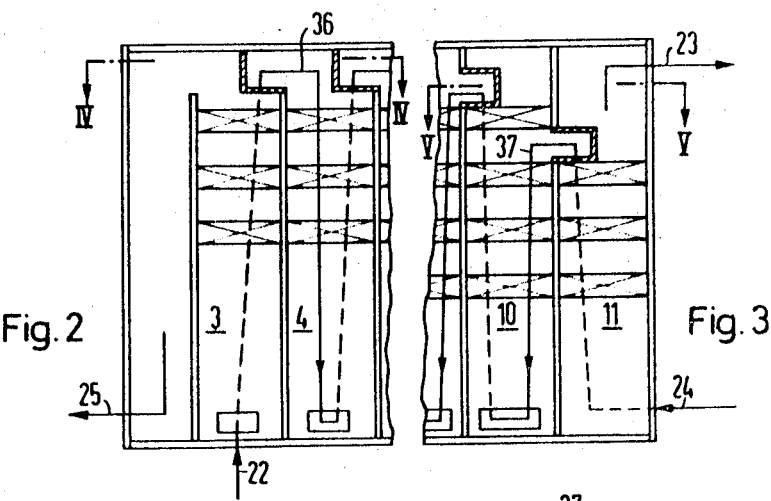
FIGS. 2 and 3 are much enlarged fragmentary views of the left-hand and right-hand ends, respectively, of the serially connected absorption columns of my invention located in upright position and showing two of the columns at the respective ends.
Figures 4, 5:
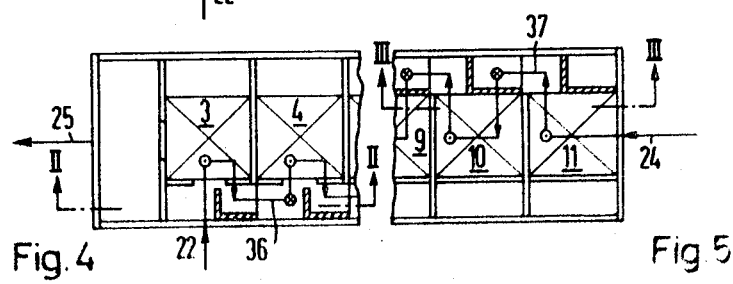
FIG. 4 is a sectional view of FIG. 2 taken along the line IV–IV in the direction of the arrows.

FIG. 2 is a sectional view of FIG. 4 taken along the line II—II in the direction of the arrows, and shows only two columns 3 and 4 at the left-hand end of the absorption unit 1 in their entirety. As can be seen more clearly in FIG. 2, the raw gas enters the column 3 from below through an inlet opening at 22. After the raw gas flow passes through the column 3 in a substantially vertical direction, it then goes through a reversing channel 36 down to the bottom of the column 4 whereat it reverses direction and once again passes in substantially vertical direction through the column 4. The raw gas flow then continues along a similar travel path through the succeeding columns of the absorption unit 1.

FIG. 3 is a sectional view of FIG. 5 taken along the line III—III in the direction of the arrows, and shows only two columns 10 and 11 at the right-hand end of the absorption unit 1 in their entirety. The regenerated cooled alkazide lye solution as aforementioned passes from below into the column 11 at 24 and is transported or entrained by gas through the porous plates of the column 11 to the head of the column 11 and passes from the latter through a reversing channel 37 at the side of the column 11 into and downward through the adjacent column 10, reversing its direction at the base of the column 10 and travelling upwardly therethrough to reverse its direction once again and thereby travel into the next adjacent column and in a similar manner through all the remaining columns of the absorption unit 1.

The purified gas, which is hydrogen in the example of this application, is discharged at the head of the column 11 through the outlet 23. In FIGS. 2 and 3, the porous plates that are shown are identified by the reference numeral 38. The height of the columns in the illustrated embodiment as shown particularly in FIGS. 2 and 3, as employed in the aforedescribed example, was respectively 50 cm and the number of porous plates in each of the columns was 13. Each porous plate had a thickness of about 1.3 cm and a diameter of 5 cm. The flow-through openings indicated a pore radius of 0.5 mm, about 40 flow-through openings being alloted to 1 $cm^2$ of plate surface.

According to a particularly favorable embodiment of the invention, the gas or gas mixture and the liquid solvent are conducted in a system formed of one or more columns and subdivided into two or more units, and in fact so that the liquid and the gas traverse each unit in the same flow direction and pass through the system in the same and/or counterflow direction. The advantage of this embodiment is primarily in that the pumps otherwise required for counterflow connection can be dispensed with entirely or for the most part. Moreover, the height of the columns can be greatly reduced by using a greater number of columns, a fact which can be of considerable importance for specific fields of use.

Figure 6:
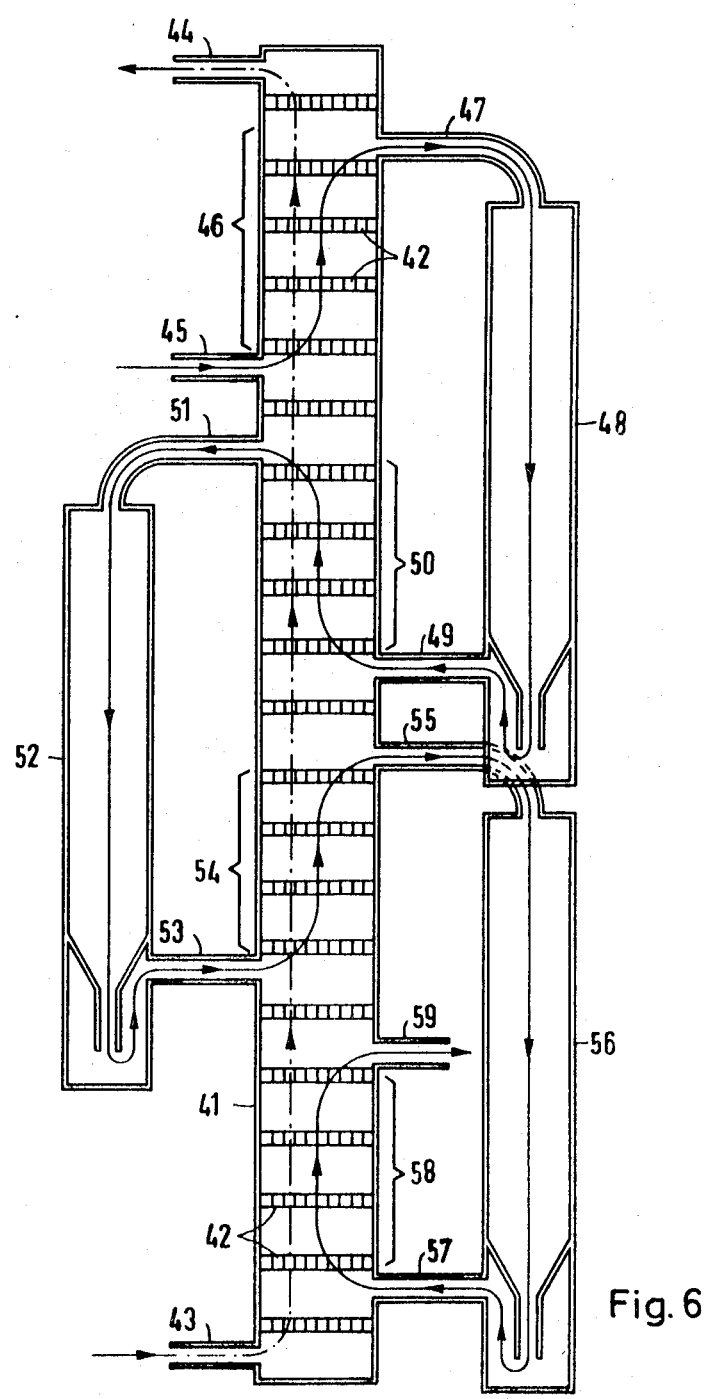
FIG. 6 is a diagrammatic view of another embodiment of FIG. 1.

According to the embodiment shown in FIG. 6, there is provided a device for carrying out the method of the invention which includes a single column provided with a plurality of vertically spaced porous plates or trays. As in the embodiment of FIGS. 1 through 5, the plates of the embodiment in FIG. 6 are formed of highly porous sintered material and are additionally provided with flow-through openings, such porous plates being disposed parallel to one another, for example. More specifically, there is shown in FIG. 6 the single column 41 provided with the plurality of sintered plates 42. Raw gas enters through the openings 43 and leaves the column 41 at 44 after flowing through 21 porous plates 42 that are in the column 41. The purified gas can then be either directly conducted to a consuming device or can be subjected to a post-treatment in a second absorption column. Inlet tubes 45 are provided for supplying absorption liquid to the column 41. The liquid entering the column 41 is entrained by the upwardly flowing gas, passes through four porous plates 42 of the unit 46 and flows through the tube 47 into an outlet well or shaft 48. From the latter, the absorption liquid passes through a line 49 into the column 41 and is transported by the upwardly flowing gas through four porous plates of the unit 50. The liquid then flows through the discharge tube 41, an outlet well or shaft 52 and a tube 53 through a column unit 54 having four porous plates and through a tube 55, an outlet well or shaft 56 and a tube 57 back into the column 41 and through four porous plates in a column unit 58. The liquid which has been enriched with impurities or saturated discharges from the column 41 through a discharge outlet 59 and is reintroduced to the column again as absorption liquid or is supplied to a desorption column or a regenerating vessel (not shown in FIG. 6). It is of course quite obvious that the aforementioned outlet wells or shafts 48, 52 and 56 can also be disposed within the column 41 proper. The embodiment shown in FIG. 6 was operated, in an example of my invention, with a gas mixture consisting of $CO_2$ and $H_2$ and with an aqueous solution of dimethylaminoacetate, hereinbefore and hereinafter referred to as alkazide lye solution, as absorption liquid.

The desorption colum or the desorption system consisting of several columns, according to my invention, can be subdivided into several units, the same as for the absorption column or system of several absorption columns according to the invention, steam and alkazide lye solution being displaceable within a unit in the same flow direction, and the individual units being connected with respect to one another in the same and/or counterflow direction.

Figure 7:
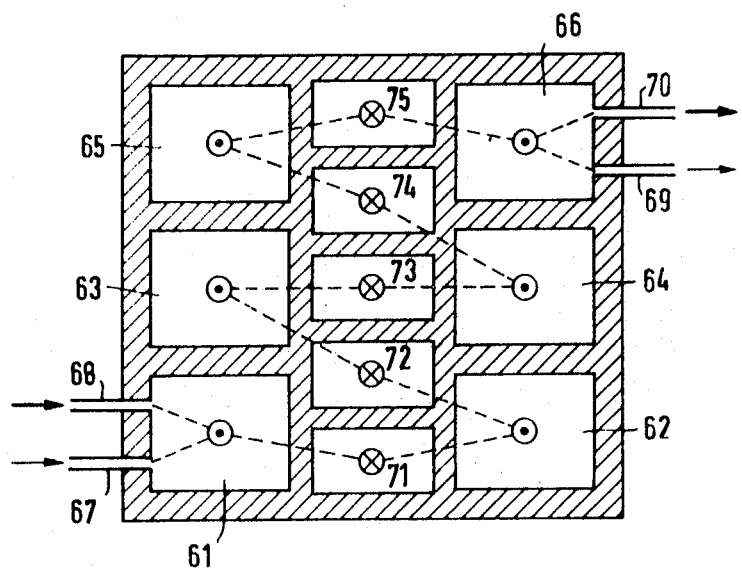
FIG. 7 is a diagrammatic view of a further embodiment of the device of my invention.

FIG. 7 shows another embodiment of the device of my invention wherein six columns are combined to form one absorption unit. The columns are identified by the reference numerals 61 to 66, each of which is furnished with nine vertically spaced trays or plates of highly porous material and which are additionally provided with parallel through-bores. Each of the columns of the embodiment shown in FIG. 7 was about 40 cm high in a preferred example thereof. Hydrogen gas containing $CO_2$ was introduced through the line 67 and absorption liquid, such as alkazide lye solution for example, was introduced through the line 68, both from below, into the column 61 so that they flowed upwardly therein, i.e. in a direction out of the plane of the drawing of FIG. 7, as represented by the encircled dot therein. After traversing the column 61, the liquid-gas mixture flows through the reversing channel 71 into the column 62 and through the reversing channel 72 into the column 63 and successively through the reversing channel 73, the column 64, the reversing channel 74, the column 65 and the reversing channel 75 into the column 66. At the head of the column 66, absorption liquid and gas are separately discharged through the lines 69 and 70 and are supplied to a second column unit consisting of six columns, if desired.

Figure 8:
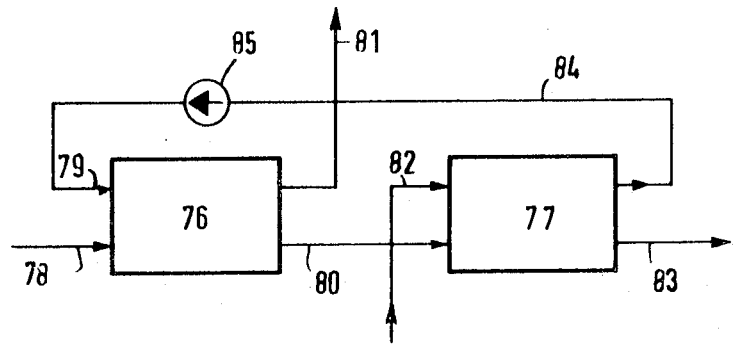
FIG. 8 is a circuit diagram for an absorption system according to the invention.

In FIG. 8 there is shown an absorption system according to the invention in which two column units are connected. The liquid-gas mixture flows within the units 76 and 77 which are formed of one or more columns respectively in the same flow direction, and gas is supplied to the unit 76 in the direction of the arrow 78 while liquid is supplied thereto in a direction of the arrow 79. At the head of the last column in the unit 76, gas and liquid are separately discharged. The gas passes through the line 80 into the unit 77 connected as a post-scrubbing device and the absorption liquid is discharged through the line 81 into a regenerating vessel, such as for example one or more desorption columns which are not shown in FIG. 8. Fresh absorption liquid is introduced at 82 into the column unit 77. As in the case of unit 76, the liquid-gas mixture is separated at the head of the last column in the unit 77 so that the purified gas is discharged at 83 and the absorption fluid, relatively weakly laden with gas, is pumped through the line 84 by means of the pump 85 into the unit 76. The separation of the liquid-gas mixture at the head of the last column of the respective units 76 and 77 is effected in a conventional manner, for example by means of a float switch.

In the embodiment shown in FIG. 8, the liquid-gas mixture is thus conducted within each unit in the same flow direction yet both units 76 and 77 are connected in accordance with the counterflow principle so that the raw gas comes into contact with partly saturated absorption liquid and the prepurified gas comes into contact with the fresh absorption liquid.

Obviously, the invention of the instant application is not limited to the aforedescribed embodiments. The number of column units can be separated at will. They can also be connected so that the flows thereof are opposite to one another or are the same as one another. Furthermore, units connected in opposing flow and in synchronized flow can be combined with one another. For special uses, for example for scrubbing or washing out gases with very strong absorbing liquids such as KOH, one or more columns can be employed having respectively a single porous tray or plate.

The method of my invention for absorbing gas or components of gas mixtures is primarily suited for affording a high degree of exchange even for devices having small structural volume. Due to the open poor structure of the column plates, a higher degree of exchange is attained so that the volume of the structure can be reduced for the $CO_2$ washes or scrubbings per cubic meter of gas throughput in an hour and for reducing the carbon dioxide from $25 \cdot 10^4$ to 200 parts per million at a liquid throughput of about 1.2 liter. This structural volume can obviously be reduced even further for greater gas throughput.

A further advantage of the method of the invention is that it can be employed without any additional control devices for quantities of gas necessary for a fuel cell system, for example. As has been additionally shown, the good results obtained are only slightly affected by placing the columns in an inclined position so that the method of my invention is especially suited for plants whose location is changeable.

Obviously, the method of my invention is not limited to the carbon dioxide washes and alkazide lye solutions of the heretofore described examples. In the case of $H_2S$ washes with alkazide lye solutions even better results are in fact obtainable.

I claim:

1. Method of absorbing gases or components of gas mixtures which comprises introducing an upwardly guided flow of gas, into at least one absorbing column having a plurality of vertically spaced filter plates formed of highly porous sintered material bodies having flow-through openings through the pores of said highly porous sintered material bodies, at a location below the top of the column, and further introducing at a location below the top of the column a liquid solvent for absorbing the gas so that the solvent is entrainable by the gas so as to travel therewith in the same flow direction to the next plate and through said absorbing column whereby absorption of the gas by the liquid solvent occurs within the pores of the filter plates, and passing the liquid solvent with the gas absorbed therein in the same flow direction through at least one desorbing column having vertically spaced filter plates similar to those in the absorbing column for desorbing the gas from the liquid solvent.

2. Method according to claim 1, wherein the gas and liquid solvent are passed through a system subdivided into at least two column units each formed of at least one column so that the gas and liquid solvent traverse each unit in the same flow direction and pass through the system of units in the same flow direction.

3. Method according to claim 1, wherein the gas and liquid solvent are passed through a system subdivided into at least two column units each formed of at least one column so that the gas and liquid solvent traverse each unit in the same flow direction and pass through the system of units in opposite flow direction.

4. Method according to claim 1, wherein the gas and liquid solvent are passed through a system subdivided into a plurality of column units each formed of at least one column so that the gas and liquid solvent traverse each unit in the same flow direction, at least two of said column units being connected to form an opposing flow path therebetween and at least two being connected to form a flow path in the same direction therebetween.

5. Method according to claim 1, wherein the absorbing liquid solvent is guided in a circuit.

6. Method according to claim 1, wherein the liquid solvent is passed through a heat exchanger before being passed into the desorption column.

7. Method according to claim 1, wherein the liquid solvent is passed through a heat exchanger before being introduced into the absorption column.

8. Method according to claim 1, wherein the liquid solvent is discharged from the desorption column and is passed through a heater.

9. Method according to claim 1, wherein a hydrostatic pressure drop is employed for passing the liquid solvent in opposite flow direction to the gas between the units.

10. Method according to claim 3, including pumping the liquid solvent with at least one pump so as to pass the liquid solvent in opposite flow direction to the gas between the units.

11. Device for absorbing gases or components of gas mixtures, comprising at least one absorbing column having a plurality of vertically spaced filter plates formed of highly porous sintered material bodies having flow-through openings through the pores of said highly porous sintered material bodies, at least one desorption column connected to said absorbing column and having vertically spaced filter plates similar to those in said absorbing column, and including first means located below the top of said absorbing column for introducing an upwardly guided flow of gas into said absorbing column, and second means located below the top of said absorbing column for introducing into said absorbing column a liquid solvent for absorbing the gas so that the liquid solvent is entrainable by the gas and passes therewith in the same direction through said absorbing column and said desorption column.

12. Device according to claim 11, including a heat exchanger connected between said absorbing column and said desorption column.

13. Device according to claim 11, wherein the pores of the respective filter plates are fifty per cent by volume of said plates.

14. Device according to claim 11, wherein said filter plates are formed predominantly with open pores.

15. Device according to claim 11, wherein the ratio of the thickness of the porous filter plates to the diameter thereof is greater than 0.1.

16. Device according to claim 11, wherein the ratio of the diameter of said flow-through openings to the thickness of said porous plates is between 0.03 and 0.3.

17. Device according to claim 11, including at least one column formed of at least two subdivided sections, said sections being connected to one another to form a flow path therebetween in the same flow direction.

18. Device according to claim 11, including at least one column formed of at least two subdivided sections, said sections being connected to one another to form a flow path therebetween in opposite flow directions.

19. Device according to claim 11, including at least one column formed of a plurality of subdivided sections, at least two of said sections being connected to one another to form a flow path therethrough in the same direction and at least two of said sections being connected to one another to form a flow path therethrough in opposite flow direction.

20. Device according to claim 11, including outlet shafts connected to said absorbing column.

21. Device according to claim 11, including a plurality of columns connected as a unit, a plurality of reversing channels being located between pairs of the columns in said units for connecting the same to one another.

22. Device according to claim 11, wherein a plurality of columns are connected in individual units, said units being in turn connected to one another, and including a pump connected between a pair of said connected units.

* * * * *

FO-1050
(5/69)

UNITED STATES PATENT OFFICE
CERTIFICATE OF CORRECTION

Patent No. 3,665,677          Dated May 30, 1972

Inventor(s) CHRISTIAN KOCH

It is certified that error appears in the above-identified patent and that said Letters Patent are hereby corrected as shown below:

In the heading to the printed specification, the name of the assignee should read --SIEMENS AKTIEN-GESELLSCHAFT-- and the number of the foreign priority application, dated March 29, 1969, should read --P 19 16 316.7--

Signed and sealed this 10th day of July 1973.

SEAL)
ttest:

DWARD M. FLETCHER, JR.          Rene Tegtmeyer
ttesting Officer                 Acting Commissioner of Patents